(12) United States Patent
Liang

(10) Patent No.: US 11,002,979 B2
(45) Date of Patent: May 11, 2021

(54) BACKLIGHT MODULE, MANUFACTURING METHOD THEREOF AND DISPLAY DEVICE

(71) Applicant: BOE TECHNOLOGY GROUP CO., LTD., Beijing (CN)

(72) Inventor: Pengxia Liang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/826,459

(22) Filed: Mar. 23, 2020

(65) Prior Publication Data
US 2021/0033879 A1    Feb. 4, 2021

(30) Foreign Application Priority Data
Jul. 29, 2019    (CN) .......................... 201910688347.2

(51) Int. Cl.
G02B 27/30    (2006.01)
F21V 5/00    (2018.01)
F21V 7/04    (2006.01)

(52) U.S. Cl.
CPC .............. *G02B 27/30* (2013.01); *F21V 5/007* (2013.01); *F21V 7/043* (2013.01)

(58) Field of Classification Search
CPC ....... G02B 27/30; F21V 5/007; F21V 7/0083; F21V 7/06; F21Y 2105/10
See application file for complete search history.

(56) References Cited

U.S. PATENT DOCUMENTS

| | | | | |
|---|---|---|---|---|
| 4,345,308 A * | 8/1982 | Mouyard | ................ | G09F 13/22 362/245 |
| 6,441,541 B1 * | 8/2002 | Tschetter | ................ | H01J 61/40 313/113 |
| 7,518,801 B2 * | 4/2009 | Davis | .................. | G02B 17/002 359/620 |

(Continued)

FOREIGN PATENT DOCUMENTS

| CN | 101606019 | 12/2009 |
|---|---|---|
| CN | 101779302 | 7/2010 |

(Continued)

OTHER PUBLICATIONS

Office action from Chinese Application No. 201910688347.2 dated Nov. 24, 2020.

*Primary Examiner* — Robert J May
(74) *Attorney, Agent, or Firm* — Calfee, Halter & Griswold LLP

(57) ABSTRACT

The present disclosure relates to the field of display technology, and provides a backlight module, a manufacturing method thereof, and a display device. The backlight module includes a base substrate, a collimation layer, and a plurality of light emitting elements. The collimation layer is disposed on one side of the base substrate, and a plurality of through holes distributed in an array are disposed on the collimation layer, and a side wall of each of the through holes can reflect light. The plurality of light emitting elements are disposed on the base substrate and located within the through holes. The backlight module provided by the present disclosure can improve the light efficiency of the backlight module in the premise of ensuring the collimation degree, at the same time, the backlight module has a simple structure and is easy to be processed.

11 Claims, 1 Drawing Sheet

(56) References Cited

U.S. PATENT DOCUMENTS

| | | | |
|---|---|---|---|
| 7,566,155 B2 * | 7/2009 | Schug | F21S 41/143 |
| | | | 362/545 |
| 7,789,536 B2 * | 9/2010 | Ijzerman | G02B 19/0066 |
| | | | 362/311.01 |
| 2010/0020566 A1 | 1/2010 | Teng | |
| 2011/0116262 A1 * | 5/2011 | Marson | F21V 7/0083 |
| | | | 362/235 |
| 2013/0016494 A1 * | 1/2013 | Speier | H01L 25/0753 |
| | | | 362/84 |

FOREIGN PATENT DOCUMENTS

| | | |
|---|---|---|
| CN | 103148453 | 6/2013 |
| CN | 108037612 | 5/2018 |
| CN | 109270698 | 1/2019 |

* cited by examiner

BACKLIGHT MODULE, MANUFACTURING METHOD THEREOF AND DISPLAY DEVICE

CROSS REFERENCE

This application is based upon and claims priority to Chinese Patent Application No. 201910688347.2, filed on Jul. 29, 2019, the entire contents thereof are incorporated herein by reference.

TECHNICAL FIELD

The present disclosure relates to the field of display technology, and in particular, to a backlight module, a manufacturing method thereof, and a display device.

BACKGROUND

With rapid development of panel display technology, its display scope and application scene are increasingly expanded. The application scenes of holographic display and light field display came into being. In such scenes, the holographic and light field and AR display can improve dizziness caused by ordinary parallax 3D display and restore all information of an object to an extremely large extent. It is a future display trend. A collimated backlight is a necessary condition and core technology for these stereoscopic display technologies.

In related art, collimated backlight module technology is generally classified into three technologies: baffle light-shielding, directional light extraction by waveguide gratings, and microlens collimation The baffle light-shielding technology is that each of organic light emitting units further includes a light-shielding isolation sleeve; the light-shielding isolation sleeve is provided outside a side wall of the organic light emitting unit; and a height of the light-shielding isolation sleeve is greater than a thickness of the organic light emitting unit. Collimation is implemented through the isolation sleeve. However, such kind of technology has extremely low collimation degree, and the collimation degree is directly proportional to the height of the isolation sleeve, so that processing is difficult.

The waveguide grating technology is that a side-in light source provides a parallel incident light to a dimming unit, and a direction of the parallel incident light is adjusted by using a grating diffraction so that a light exit side emits collimated light. Since the backlight provided by the collimated backlight can be emitted in a specific direction, the display panel is provided with a collimated backlight. However, the technology needs to provide a light source with a single incident direction, which itself is a technical difficulty, and processing and using of the light grating are also difficult.

The microlens array collimating backlight structure includes a microlens array and a light source. A plurality of light through holes is provided between the light source and the microlens array, and is respectively disposed corresponding to respective microlenses in the microlens array. In this solution, the light through holes are located at focal points of the respective microlenses in the microlens array, so that the collimated backlight structure can make the backlight light emitted thereby to be the collimated light. In this solution, the light efficiency is extremely low because openings are required to limit a divergence angle of the light source.

SUMMARY

An object of the present disclosure is to provide a backlight module, which is used to solve problems of large divergence angle, low light efficiency, and difficult processing of the backlight module in the related technical.

Other features and advantages of the disclosure will become apparent from the following detailed description, or may be learned in part through the practice of the disclosure.

According to an aspect of the present disclosure, a backlight module is provided, and includes: a base substrate, a collimation layer, and a plurality of light emitting elements. The collimation layer is disposed on one side of the base substrate, and a plurality of through holes distributed in an array are disposed on the collimation layer, and a side wall of each of the plurality of the through holes can reflect light. The plurality of light emitting elements are disposed on the base substrate and each of the light emitting elements is located within one of the plurality of the through holes.

In an exemplary embodiment of the present disclosure, a refractive layer is provided on a side wall of each of the plurality of the through holes, and a refractive index of the refractive layer is greater than a refractive index of the collimation layer.

In an exemplary embodiment of the present disclosure, a reflective layer is provided on a side wall of each of the plurality of the through holes.

In an exemplary embodiment of the present disclosure, a material of the collimation layer is a reflective material.

In an exemplary embodiment of the present disclosure, the backlight module further includes: a lens array disposed on the collimation layer, wherein the lens array includes a plurality of lenses, and each of the plurality of the lenses corresponds to one of the plurality of the through holes so that the plurality of the light emitting elements are located at focal points of the lenses respectively.

In an exemplary embodiment of the present disclosure, the backlight module further includes: a lens array disposed on the collimation layer, wherein the lens array includes a plurality of lenses, and each of the plurality of the lenses corresponds to one of the plurality of the through holes.

In an exemplary embodiment of the present disclosure, a projection of the side wall of each of the plurality of the through holes on a cross section perpendicular to a plane on which the substrate is located is a curve, and the curve causes light from each of the plurality of light emitting elements to be incident on the side wall of a corresponding one of the plurality of the through-holes emitting in a direction substantially perpendicular to a surface of the base substrate.

In an exemplary embodiment of the present disclosure, a cross section of an opening of each of the plurality of the through-holes parallel to a plane on which the base substrate is located is circular.

In an exemplary embodiment of the present disclosure, the base substrate and the collimation layer are an integrated structure.

According to an aspect of the present disclosure, a method for manufacturing a backlight module is provided, and is used for manufacturing the backlight module mentioned above, and includes:

providing a base substrate;

forming a plurality of light emitting elements distributed in an array on the base substrate by a transfer printing technology;

providing a collimation layer, wherein the collimation layer is provided with a plurality of through holes in the same distribution manner as the plurality of the light emitting elements, and a side wall of each of the plurality of the through holes can reflect light;

bonding the collimation layer to the base substrate so that each of the plurality of the light emitting elements is located in one of the plurality of the through holes.

According to an aspect of the present disclosure, a method for manufacturing a backlight module is provided, and used for manufacturing the backlight module mentioned above, and includes:

providing a base structure including a collimation layer and a base substrate;

opening slots on the base structure so that a plurality of through holes distributed in an array are formed on the collimation layer, and a side wall of each of the through holes can reflect light;

forming a plurality of light emitting elements in the slots by a transfer printing technology.

According to an aspect of the present disclosure, a display device is provided, and includes the backlight module mentioned above.

The present disclosure provides a backlight module, a manufacturing method thereof, and a display device. The backlight module includes a base substrate, a collimation layer, and a plurality of light emitting elements. The collimation layer is disposed on one side of the base substrate, and a plurality of through holes distributed in an array are disposed on the collimation layer, and a side wall of each of the through holes can reflect light. The plurality of light emitting elements are disposed on the base substrate and located in the through holes. The backlight module provided by the present disclosure can collimate light through through holes; at the same time, the side wall of the through hole with a reflection function can also reflect light, to prevent light from being emitted or absorbed from the side wall of the through hole, thereby improving light efficiency. On one hand, the backlight module provided by the present disclosure can improve the light efficiency of the backlight module while ensuring the collimation degree. On the other hand, the backlight module has a simple structure and is easy to be processed.

It should be understood that the above general description and the hereinafter detailed description are merely exemplary and explanatory, and should not limit the present disclosure.

BRIEF DESCRIPTION OF THE DRAWINGS

The accompanying drawings herein, which are incorporated in the specification and constitute a part of the specification, show embodiments of the present disclosure and explain the principles of the present disclosure along with the specification. Obviously, the drawings in the following description are provided to merely illustrate some of the embodiments of the present disclosure. For those ordinary skilled in the art, other drawings may also be obtained according to these drawings without any creative work.

DETAILED DESCRIPTION

Figure 1:
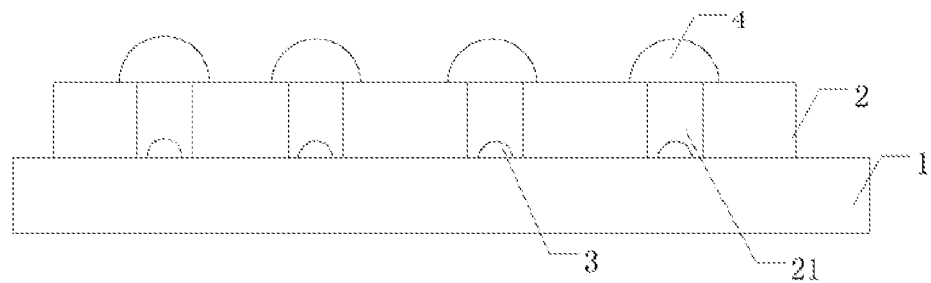
FIG. 1 is a schematic structural diagram of an exemplary embodiment of a backlight module of the present disclosure.

Example embodiments will now be described more fully with reference to the accompanying drawings. However, the exemplary embodiments can be implemented in various forms and should not be construed as limiting the examples as set forth herein. Instead, these implementations are provided so that this disclosure will be thorough and complete, and concept of the exemplary implementation will be fully conveyed to those skilled in the art. Same reference numbers denote the same or similar structures in the drawings, and thus the detailed description thereof will be omitted.

Although relative terms such as "above" and "below" are used in this specification to describe the relative relationship between one component and another component of an icon, these terms are used in this specification for convenience only, for example, according to a direction of the examples as shown in the drawings. It can be understood that if the device of the icon is turned upside down, the component indicated as being the "above" will become the component below. Other relative terms, such as "high", "low", "top", "bottom", "left" and "right" have similar meanings. When a structure is "on" another structure, it is possible to indicate that a structure is integrally formed on another structure, or that a structure is "directly" arranged on another structure, or that a structure is "indirectly" arranged on another structure through a further structure.

The terms "a", "an", "said" are used to indicate presence of one or more elements/components/etc.; the terms "include" and "have" are used herein, are intended to be inclusive, and mean there may be additional elements/components/ or the like other than the listed elements/components/ or the like.

This exemplary embodiment firstly provides a backlight module, as shown in FIG. 1, it is a schematic structural diagram of an exemplary embodiment of a backlight module of the present disclosure. The backlight module includes a base substrate 1, a collimation layer 2, and a plurality of light emitting elements 3. The collimation layer 2 is disposed on a side of the base substrate 1. The collimation layer 2 is provided with a plurality of through holes 21 distributed in an array, and a side wall of each of the plurality of the through holes 21 can reflect light. The plurality of light emitting elements 3 are disposed on the base substrate and each of the plurality of the light emitting elements 3 is located in one of the through holes 21.

The present disclosure provides a backlight module. The backlight module includes a base substrate, a collimation layer, and a plurality of light emitting elements. The collimation layer is disposed on a side of the base substrate, and is provided with a plurality of through holes distributed in an array, and a side wall of the through holes can reflect light. The plurality of light emitting elements are disposed on the base substrate and located within the through holes. The backlight module as provided by the present disclosure may collimate light via the through holes; at the same time, the side wall of the through hole with a reflection function may also reflect light, to prevent light from being emitted or being absorbed from the side wall of the through hole, and thereby improving light efficiency. On one hand, the backlight module provided by the present disclosure can improve the light efficiency of the backlight module while ensuring the collimation degree. On the other hand, the backlight module has a simple structure and is easy to be processed.

In this exemplary embodiment, the base substrate 1 may be a flexible or rigid base substrate, such as glass, PI (polyimide), or PET (polyterephthalate plastic), and the collimation layer 2 may be made of glass, quartz, or silicon wafer, metal, PET, PMMA (polymethyl methacrylate), COC (typical cyclic olefin copolymer) and other resin materials, organic or inorganic materials. Each of the plurality of the light emitting elements 3 may correspond to one of the plurality of the through holes 21, and the through holes 21 may extend along the layer direction of the collimation layer. The light emitting element may be a mini-LED or a micro-LED.

In this exemplary embodiment, one possible implementation manner in which the side wall of the through hole 21 reflects light may be that the collimation layer 2 is directly made from a material having an ability to reflect light, for example, the collimation layer may be made of a metal.

In this exemplary embodiment, another possible implementation manner in which the side wall of the through hole 21 reflects light may also be that a refractive layer is provided on the side wall of the through hole, and a refractive index of the refractive layer is greater than a refractive index of the collimation layer. By utilizing the principle of total reflection of light, when the light propagates from a light dense medium to a light sparse medium, if an incident angle of the light is greater than a critical angle, the light will entirely return to the light dense medium. Therefore, a part of the light emitted to the collimation layer through the refractive layer will be entirely reflected back to the refractive layer.

In this exemplary embodiment, another possible implementation manner in which the side wall of the through hole 21 reflects light may also be that a reflective layer is provided on the side wall of the through hole. The reflective layer may be used to reflect light, and the reflective layer may be a metallic reflective layer.

In this exemplary embodiment, as shown in FIG. 1, the backlight module may further include a lens array. The lens array is disposed on the collimation layer 2. The lens array includes a plurality of lenses 4. Each of the plurality of the lenses is disposed corresponding to one of the plurality of the through holes 21, that is, each of the plurality of the lenses 4 may correspond to one of the plurality of the through holes 21, so that the light emitting elements 3 are located at focal points of the lenses 4. The lens may be one of a super-surface lens, a Fresnel lens, and a holographic lens, and the lens may emit light emitted from the light emitting element in a collimation direction.

Figure 2:
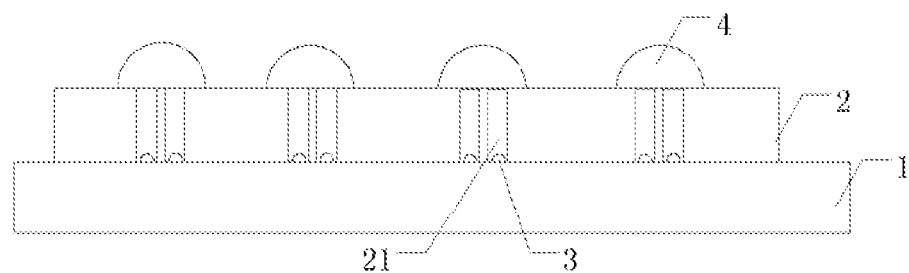
FIG. 2 is a schematic structural diagram of another exemplary embodiment of a backlight module of the present disclosure.

In this exemplary embodiment, as shown in FIG. 2, it is a schematic structural diagram of another exemplary embodiment of a backlight module of the present disclosure. The backlight module may further include a lens array disposed on the collimation layer. The lens array includes a plurality of lenses 4, and the lenses 4 may be disposed corresponding to a plurality of the through holes. The present exemplary embodiment is described as an example of one lens corresponding to two through holes. In this exemplary embodiment, although the light emitting element is not located at the focal point of the lens 4, the backlight is deviated in a short distance from the focal point, so that the backlight module can still reach a high collimation degree.

Figure 3:
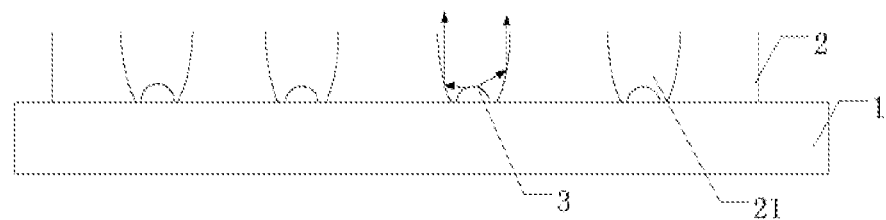
FIG. 3 is a schematic structural diagram of another exemplary embodiment of a backlight module of the present disclosure.

In this exemplary embodiment, as shown in FIG. 3, it is a schematic structural diagram of another exemplary embodiment of a backlight module of the present disclosure.

A projection of the side wall of each of the plurality of the through holes on a cross section perpendicular to a plane on which the substrate is located is a curve. Such arrangement is provided such that the light incident from the light emitting element to the side wall of the through hole may be emitted in a collimation direction by setting a curvature of each position of the curve. Arrow directions in FIG. 3 indicate light propagation directions.

In this exemplary embodiment, the through-hole opening may be circular, oval, square, or the like. A cross section of an opening of each the plurality of the through-holes parallel to a plane on which the base substrate is located is circular.

In this exemplary embodiment, a method for manufacturing above the backlight module may be presented as follows: firstly, a base substrate may be provided, and at the same time, a driving circuit for a light emitting element is provided on the base substrate; then, a plurality of light emitting elements distributed in an array are formed on the base substrate by a transfer printing technology, and at the same time, the light emitting elements are connected to the driving circuits thereof; then, a collimation layer is provided, and through holes distributed in the same manner as the light emitting elements are provided on the collimation layer, and at the same time, side walls of the through holes are enabled to reflect light by any of the above methods; then, the collimation layer is bonded to the base substrate so that the light emitting elements are located in the through holes. Finally, a lens array is formed, and the lens array is bonded to the collimation layer.

Wherein, a plurality of light emitting elements distributed in an array are formed on the base substrate by the transfer printing technology. The light emitting element may be connected to the driving circuit in a manner of the light emitting element itself having pins (i.e., plug-in pins), or the pins of the light emitting element may be connected to the driving circuit by the way of soldering. The collimation layer is provided with through holes in the same distribution mode as the light emitting elements, which can be processed by the way of a base substrate+mechanical cutting or may be prepared by an injection molding method. The collimation layer is bonded to the base substrate by using a 3D panel bonding machine. The device is characterized by using a high-precision optical alignment system and high-precision glue dispensing device, and the device adopts vacuum bonding, such that generation of air bubbles can be avoided, and the alignment accuracy can reach 2 μm, and thereby meeting the design indicators of the present disclosure. A lens array is formed by an injection molding process. The material of the lens may be a resin material such as PMMA or COC. It is also possible that the lens array may be bonded to the collimation layer first, and then the collimation layer may be bonded to the base substrate.

Figure 4:
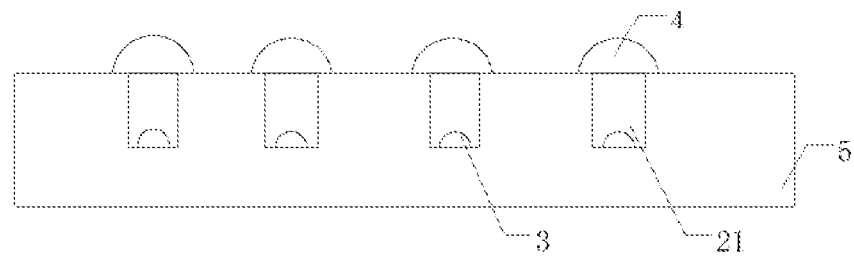
FIG. 4 is a schematic structural diagram of another exemplary embodiment of a backlight module of the present disclosure.

In the present exemplary embodiment, during the bonding process of the base substrate and the collimation layer, it is inevitable that a poor bonding phenomenon such as the air bubbles will occur. In this exemplary embodiment, as shown in FIG. 4, it is a schematic structural diagram of another exemplary embodiment of a backlight module of the present disclosure. The base substrate and the collimation layer may be an integrated structure 5.

As manufacturing the backlight module, firstly, a groove may be directly opened in the integrated structure 5, while the side wall of the through hole can reflect light through any of the above methods; then, a light emitting element is formed in the groove by a transfer printing technology; finally, a lens array is formed, and the lens array is bonded to the integrated structure 5.

This exemplary embodiment also provides a method for manufacturing a backlight module, which is used to manufacture the above-mentioned backlight module. The method includes:

providing a base substrate;

forming a plurality of light emitting elements distributed in an array on the base substrate by a transfer printing technology;

providing a collimation layer, wherein the collimation layer is provided with through holes in the same distribution manner as the light emitting elements, and a side wall of each of the plurality of the through holes can reflect light;

bonding the collimation layer to the base substrate so that the light emitting elements are located in the through holes respectively.

The manufacturing method of the backlight module provided in this exemplary embodiment has the same technical features and working principles as the above-mentioned backlight module. The above contents have been described in detail, thus, a duplicated description will not be repeated herein.

This exemplary embodiment also provides a method for manufacturing a backlight module, which is used to manufacture the above-mentioned backlight module. The method includes:

providing a base structure including a collimation layer and a base substrate;

opening slots on the base structure so that a plurality of through holes distributed in an array are formed on the collimation layer, and a side wall of each of the plurality of the through holes can reflect light;

forming light emitting elements in the slots by a transfer printing technology.

The manufacturing method of the backlight module provided in this exemplary embodiment has the same technical features and working principles as the above-mentioned backlight module. The above contents have been described in detail, thus, a duplicated description will not be repeated herein.

The present exemplary embodiment further provides a display device, which includes the above-mentioned backlight module.

The display device provided in this exemplary embodiment has the same technical features and working principle as the above-mentioned backlight module, and the above contents have been described in detail, thus, a duplicated description will not be repeated herein.

Other embodiments of this application will be apparent to those skilled in the art for consideration of the specification and practice of the disclosure herein. This application is intended to cover any variations, uses, or adaptations of the invention following the general principles thereof and including such departures from the present disclosure as come within known or customary practice in the art. It is intended that the specification and examples can be considered as illustrative only, with a real scope and spirit of the invention being indicated by the following appended claims.

It should be understood that the present disclosure is not limited to the precise structure that has been described above and illustrated in the accompanying drawings, and various modifications and changes may be made without departing from the scope thereof. The scope of the disclosure is limited only by the following claims.

What is claimed is:

1. A backlight module, comprising:
a base substrate;
a collimation layer disposed on one side of the base substrate, wherein a plurality of through holes distributed in an array are disposed on the collimation layer, and a side wall of each of the plurality of the through holes reflects light;
a plurality of light emitting elements, disposed on the base substrate and each of the plurality of the light emitting elements located within one of the plurality of the through holes,
wherein a refractive layer is provided on the side wall of each of the plurality of the through holes, and a refractive index of the refractive layer is greater than a refractive index of the collimation layer,
wherein each of the through holes has a rectangle cross section that is perpendicular to a contact surface of the base substrate and the collimation layer.

2. The backlight module according to claim 1, wherein a reflective layer is provided on the side wall of each of the plurality of the through holes.

3. The backlight module according to claim 1, wherein a material of the collimation layer is a reflective material.

4. The backlight module according to claim 1, further comprising:
a lens array disposed on the collimation layer, wherein the lens array comprises a plurality of lenses, and each of the plurality of the lenses corresponds to one of the plurality of the through holes so that the plurality of the light emitting elements are located at focal points of the lenses respectively.

5. The backlight module according to claim 1, further comprising:
a lens array disposed on the collimation layer, wherein the lens array comprises a plurality of lenses, and each of the plurality of the lenses corresponds to one of the plurality of the through holes.

6. The backlight module according to claim 1, wherein a projection of the side wall of each of the plurality of the through holes on a cross section perpendicular to a plane on which the substrate is located is a curve, and the curve causes light from each of the plurality of light emitting elements to be incident on the side wall of a corresponding one of the plurality of the through-holes emitting in a direction substantially perpendicular to a surface of the base substrate.

7. The backlight module according to claim 6, wherein a cross section of an opening of each of the plurality of the through-holes parallel to a plane on which the base substrate is located is circular.

8. The backlight module according to claim 1, wherein the base substrate and the collimation layer are an integrated structure.

9. A method for manufacturing a backlight module, used for manufacturing the backlight module according to claim 1, comprising:
providing a base substrate;
forming a plurality of light emitting elements distributed in an array on the base substrate by a transfer printing technology;
providing a collimation layer, wherein the collimation layer is provided with a plurality of through holes in the same distribution manner as the plurality of the light emitting elements, and a side wall of each of the plurality of the through holes reflects light;
bonding the collimation layer to the base substrate so that each of the plurality of the light emitting elements is located in one of the plurality of the through holes.

10. A method for manufacturing a backlight module, used for manufacturing the backlight module according to claim 8, comprising:
- providing a base structure comprising a collimation layer and a base substrate;
- opening slots on the base structure so that a plurality of through holes distributed in an array are formed on the collimation layer, and a side wall of each of the through holes reflects light;
- forming a plurality of light emitting elements in the slots by a transfer printing technology.

11. A display device, comprising the backlight module according to claim 1.

* * * * *